United States Patent [19]
Stewart

[11] 3,779,236
[45] Dec. 18, 1973

[54] PRESSURE RELIEF VALVE FOR A SPHYGMOMANOMETER

[75] Inventor: James M. Stewart, West Palm Beach, Fla.

[73] Assignee: Stewart Research, Inc., West Palm Beach, Fla.

[22] Filed: Sept. 7, 1971

[21] Appl. No.: 178,212

[52] U.S. Cl............ 128/2.05 G, 251/259, 251/145
[51] Int. Cl.............................................. A61b 5/02
[58] Field of Search........................... 251/145, 259; 128/2.05 G

[56] References Cited
UNITED STATES PATENTS
3,504,663  4/1970  Edwards ................... 128/2.05 G
3,620,250  11/1971  Wieck ....................... 251/145 X
2,955,616  10/1960  Jarret et al ................ 251/259

Primary Examiner—Samuel Scott
Assistant Examiner—Ira S. Lazarus
Attorney—Marcus B. Finnegan et al.

[57] ABSTRACT

A pressure relief valve assembly particularly for use with a sphygmomanometer having a housing, an internal axial bore for passing pressurized air through the housing, a transverse bore intersecting the axial bore and communicating with the exterior of the housing, a flexible, resilient member mounted within the axial bore and sealing off the intersecting end of the transverse bore, and actuating means extending through the transverse bore for depressing the resilient member away from sealing relationship with the transverse bore to permit selective relief of the pressurized air.

9 Claims, 5 Drawing Figures

INVENTOR
JAMES M. STEWART

BY Finnegan, Henderson & Farabow
ATTORNEYS

INVENTOR
JAMES M. STEWART

PRESSURE RELIEF VALVE FOR A SPHYGMOMANOMETER

This invention relates to a pressure relief valve and more particularly, to a new and improved pressure relief valve assembly for a sphygmomanometer that permits the operator to accurately and conveniently control the rate of relief of pressurized air.

In the measuring of blood pressure with a sphygmomanometer, a main artery is compressed by an inflatable cuff wrapped around an arm or a leg until the flow of blood therethrough is completely stopped indicating that the cuff has been inflated to a pressure above that of the blood's pressure. The air is then released slowly while the physician listens for changing sound of the pulse. First evidence of passage of blood through the artery is detected, and then the air is further released slowly until the character of the sound again changes, indicating that blood is flowing normally through the artery. Observation of a pressure gauge by the physician at these two points gives the necessary systolic and diastolic pressures. During use of the instrument, it is important that the physician be able to release air from the cuff very slowly, especially when making the systolic and diastolic observations, and also that he be able to rapidly release air from the cuff after these values have been observed.

Accordingly, it is a primary object of the present invention to provide a new and improved pressure relief valve, particularly for use with a sphygmomanometer, whereby pressurized air or other gas in the system may be conveniently and accurately released at a controllable slow rate or at a rapid rate as desired by the operator.

It is a further object of this invention to provide a new and improved pressure relief valve for a sphygmomanometer that is simplified in construction and reliable and efficient in use and that permits the operator to more accurately and conveniently control the rate of relief of the pressurized air than has been provided heretofore in prior art systems.

Additional objects and advantages of this invention will be set forth in part in the description which follows and in part will be obvious from the description or may be learned by practice of the invention, the objects and advantages being realized and attained by means of the instrumentalities, devices, and combinations particularly pointed out in the appended claims.

To achieve the foregoing objects and in accordance with its purpose, the pressure relief valve assembly of this invention, as embodied and broadly described, comprises a valve housing having an internal axial bore and an inlet end and an outlet end communicating with the bore, a transverse bore intersecting the axial bore and communicating with the exterior of the housing, a flexible resilient member mounted within the axial bore and sealing off the intersecting end of the transverse bore, and actuating means extending through the transverse bore for depressing the resilient member away from sealing relationship with the transverse bore and thereby permitting selective relief of the pressurized air.

The accompanying drawings which are incorporated and constitute a part of this specification illustrate an embodiment of the invention and together with the description serve to explain the principles of the invention.

It is to be understood that both the foregoing general description and the following detailed description are exemplary and explanatory but are not restrictive of the invention.

Reference will now be made in detail to a preferred embodiment of the invention, an example of which is illustrated in the accompanying drawings.

For convenience, the invention will be described as it relates for use with a sphygmomanometer. It will be appreciated by those skilled in the art, however, that the valve is equally useful in other applications where it is necessary to control the rate of relief of a gas or other fluid in a pressurized system.

Figure 1:
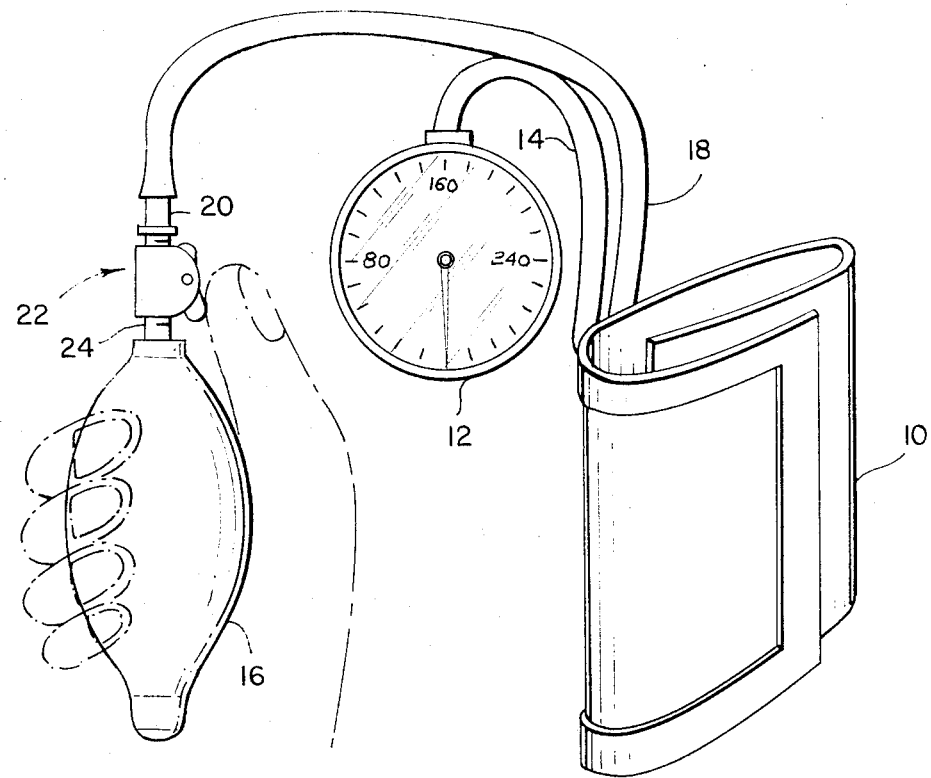
FIG. 1 is a perspective view of a sphygmomanometer embodying the pressure relief valve of the present invention and utilizing a dial pressure gauge.

A typical sphygmomanometer is illustrated in FIG. 1 and consists basically of an inflatable cuff 10 and a dial pressure gauge 12 connected to the cuff through a tube 14 for measuring air pressure in the inflated cuff. A bulb 16 for inflating the cuff is provided and a tube 18 connects to the cuff and a coupling 20 for passing air from the bulb to cuff 10.

The new and improved pressure relief valve assembly of the present invention is generally indicated as 22 and is connected between coupling 20 and a suitable coupling 24 on the end of inflating bulb 16, thus locating the valve for convenient manipulation by the thumb of the operator.

Figure 2:
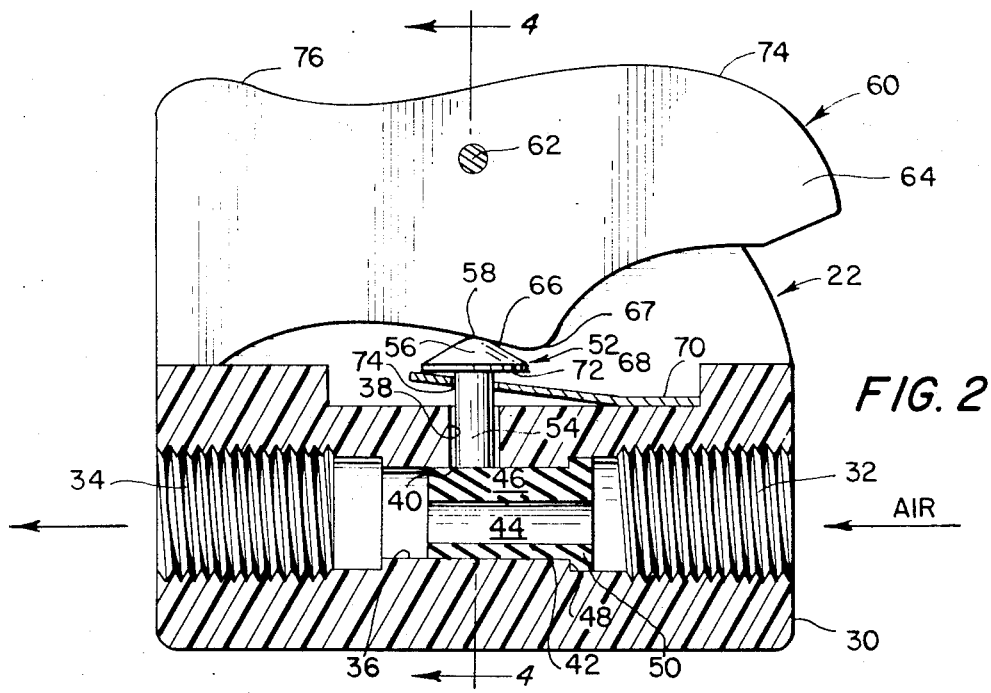
FIG. 2 is a side sectional view of a valve assembly of the present invention in a closed position.
Figure 3:
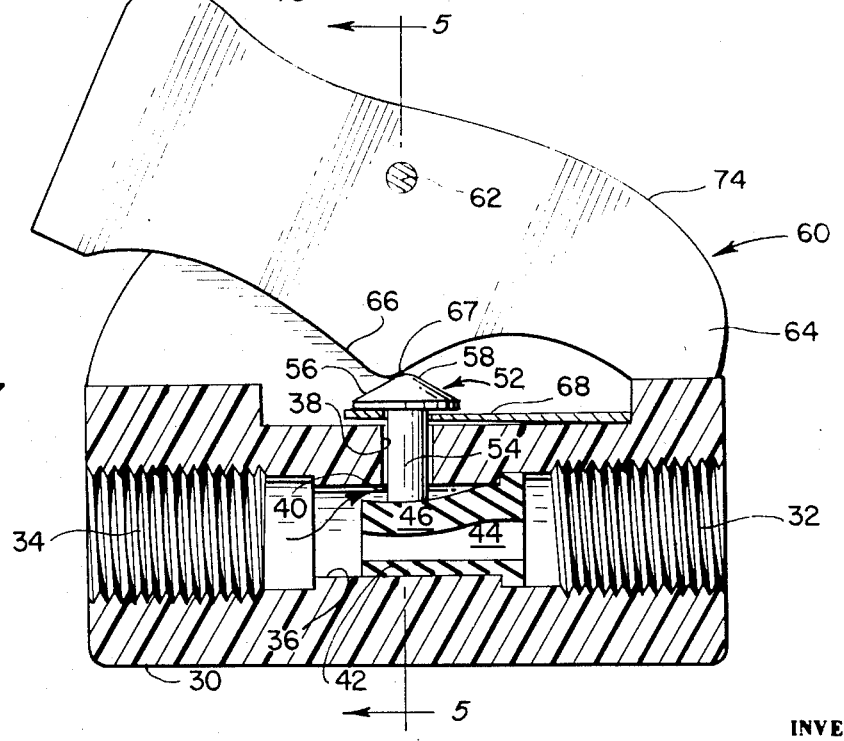
FIG. 3 is a side sectional view of the valve similar to FIG. 2 but with the valve in a full open position.

With reference to more detailed views of the valve, as shown in FIGS. 2 and 3, the pressure relief valve assembly of this invention includes a valve housing 30 having a gas inlet end 32 for connection to coupling 24 on bulb 16 and a gas outlet end 34 for connection to coupling 20. As shown in FIGS. 2 and 3, inlet and outlet ends 32 and 34 are provided, for example, with a threaded internal bore that screws onto a similar threaded shank (not shown) on the ends of couplings 24 and 20, respectively. It will be appreciated, of course, that any other suitable connecting means, such as a bayonet or friction-type fit, may be used for connecting the valve in the system or that the valve and couplings may be made of one piece without departing from the scope of the present invention.

As best shown in FIGS. 2 and 3, valve housing 30 has an internal axial bore 36 communicating with inlet end 32 and outlet end 34 and a transverse bore 38 intersecting axial bore 36 at 40 and communicating with the exterior of housing 30. Preferably, housing 30 is constructed of plastic or any other suitable material.

In accordance with the invention, a flexible, resilient member is mounted within axial bore 36 and adjacent transverse bore 38 to seal off the intersecting end 40 of the transverse bore.

As embodied and as shown in FIGS. 2 and 3, this member comprises a deformable and resilient sleeve 42, preferably of a rubbery material such as silicon rubber, having an internal passageway 44 and mounted in tight-fitting relationship with the internal surfaces of axial bore 36. Thus, when sleeve 42 is in its at-rest or normal position, as shown in FIG. 2, it effectively seals off the intersecting end 40 of transverse bore 38 and prevents the escape of pressurized air from the valve.

Figure 4:
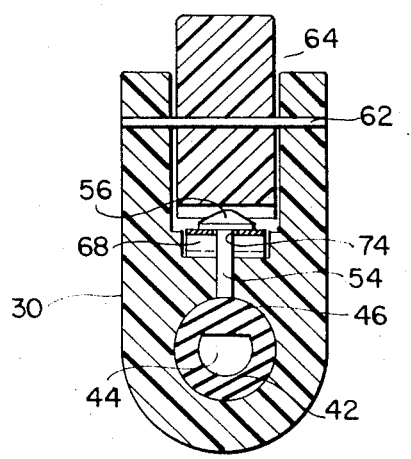
FIG. 4 is a sectional view taken along the lines 4—4 of FIG. 2.
Figure 5:
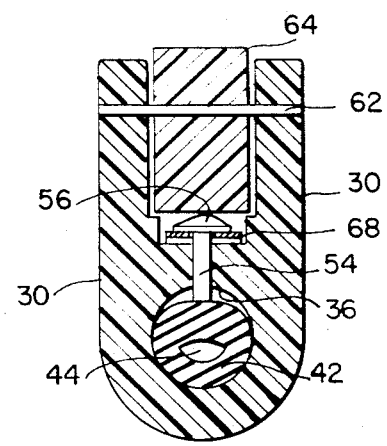
FIG. 5 is a sectional view taken along the lines 5—5 of FIG. 3.

As more fully described below and as best shown in FIGS. 4 and 5, sleeve 42 has a thickened wall portion 46 located adjacent transverse bore 38 to provide more rigidity and greater resistance to wear to the sleeve. Means are further provided for orienting and retaining sleeve 42 in position in axial bore 36, which means comprises a shoulder 48 in bore 36 facing the inlet end 32 of the valve and a corresponding lip 50 on the inlet end of sleeve 42 that rests against shoulder 48 and keeps the sleeve in position.

In accordance with the invention, actuating means are provided that extend through transverse bore 38 to depress tubular sleeve 42 away from sealing engagement with transverse bore 38 and thereby permit selective relief of pressurized air from the valve.

As embodied, and as best shown in FIGS. 2 and 3, this means comprises a valve plunger, generally 52, axially movable with respect to transverse bore 38. Plunger 52 consists of a stem portion 54 located within bore 38 and integral head portion 56 outside of and of greater diameter than bore 38. Further, the tip of plunger head 56 is generally conically shaped to provide a cam surface 58 for actuation by a control member, generally 60, pivotally mounted at 62 to valve housing 30.

As best shown in FIGS. 2 and 3, control member 60 consists of a lever arm 64, having an upper thumb-engaging surface, movable between a valve-closed position, as shown in FIG. 2, and a valve full-open position, as shown in FIG. 3. Lever arm 64 also has a lower cam surface 66 cooperating with cam surface 58 on plunger head 56 to effect depression of plunger 52 and sleeve 42 as the arm moves between closed and opened positions. As best shown in FIGS. 2 and 3 and as more fully described below in connection with the operation of the device, as lever 64 moves from closed towards open position, cam 66 gradually depresses plunger 52 and sleeve 42 to permit slow release of the pressurized air. After the center part 67 of cam 66 passes over the top center of cam surface 58, plunger 52 and sleeve 42 are locked in full-open position to permit rapid release of air from the valve.

In accordance with the invention, spring means are further provided for biasing valve plunger 52 away from sleeve 42 and toward the "valve-closed" position shown in FIG. 2. As embodied and as shown in FIGS. 2 and 3, the spring means comprises a leaf spring 68 mounted at 70 to housing 30 and acting against the underside 72 of plunger head 56 to keep the plunger up and towards the valve-closed position. Preferably, and as best shown in FIGS. 4 and 5, spring 68 extends along both sides of plunger head 56 and has an aperture 74 for valve stem 54.

In operation of a sphygmomanometer with the valve assembly of this invention and with the valve in closed position, as shown in FIG. 2, the physician squeezes bulb 16, feeding pressurized air through coupling 24, valve inlet 32, passageway 44 of sleeve 42, valve outlet 34, coupling 20, and tube 18 into inflatable cuff 10. With the valve in closed position, sleeve 42 seals off transverse bore 38 preventing the escape of air from the valve but does not interfere with the passage of air to the cuff. While the resilience of the sleeve provides a significant degree of sealing capability it will be appreciated that additional sealing is also provided by the increased internal air pressure passing through the interior of the sleeve.

A one-way valve (not shown) is generally provided in coupling 24 to prevent the air from returning to bulb 16 after pressure is released on the bulb and pumped again by the physician.

After the cuff has been inflated to the desired degree as discussed above, the physician gently depresses the rearward or right-hand end 74 (see FIG. 2) of lever 64 causing cam surface 66 to ride up on cam surface 58 and slowly depress plunger 52 and deform sleeve 42 to permit slow relief of air from the system. With reference to FIGS. 2 and 3, it can be seen that as the lever moves from the point shown in FIG. 2 to the position shown in FIG. 3, the degree of camming and hence the rate of release of the air can be accurately controlled by the thumb of the physician. Thus, during this variable phase of operation between the positions shown in FIGS. 2 and 3, the air may be permitted to escape in varying degrees merely by altering the relative position of the cam lever through finger pressure. This permits the physician to controllably release the air very slowly at first so that both the systolic and diastolic pressures can be observed. Once these readings are observed, the physician pushes all the way down to the right-hand end of lever 64 clicking the center point 67 of cam 66 over the top of cam surface 58 and locking the valve in full-open position to permit rapid release of air and quick removal of the cuff.

Before the next cycle of function is desired, the forward or left-hand portion 76 (see FIG. 2) of lever 64 is depressed causing arm 66 to release valve plunger 52 and close the valve.

Thus, it will be apparent that the foregoing invention provides a unique and convenient valve assembly for a sphygmomanometer that permits release of the pressurized air at both a controllable slow rate and at a rapid rate as desired by the operator.

The invention in its broader aspects is not limited to the specific details shown and described and departures may be made from such details without departing from the principles of the invention and without sacrificing its chief advantages.

What is claimed is:

1. A sphygmomanometer comprising an inflatable cuff, a bulb providing air pressure, an indicating gauge connected to the cuff for measuring air pressure in the cuff, a tube communicating with the cuff, and a pressure-relief valve assembly connecting the bulb to the tube for permitting selective relief of the pressurized air from the cuff, said valve assembly comprising a valve housing having an inlet end connected to the bulb and an outlet end connected to the tube and an internal, axial bore communicating with the inlet and outlet ends, a transverse bore substantially perpendicular to and intersecting the axial bore and communicating with the exterior of the housing, a resilient annular sleeve mounted tightly within the axial bore and sealing off the intersecting end of the transverse bore in normal position while providing communication between the inlet and outlet ends of the housing, and actuating means including a valve plunger axially movable within the transverse bore for acting against said sleeve, said plunger being spring biased in a direction away from the resilient sleeve, and a control lever limiting outward movement of the plunger and for selectively depressing the plunger inwardly against the sleeve to move the sleeve away from sealing relationship with the transverse bore and thereby permit varied relief of the pressurized air from the inflatable cuff.

2. The assembly of claim 1, wherein the sleeve has a thickened wall portion adjacent the transverse bore.

3. The assembly of claim 1, including means for retaining the sleeve in the axial bore against the force of pressurized air passing through the valve assembly.

4. The assembly of claim 3, wherein said retaining means comprises a shoulder in the bore facing the inlet end of the valve and a corresponding lip around one end of the sleeve cooperating with the shoulder to keep the sleeve in position.

5. The assembly of claim 1, wherein the control lever comprises a lever arm pivotally mounted on the housing said lever arm having a cam surface cooperating with a cam surface on the valve plunger and operable between a valve-closed position when the resilient sleeve is sealed against the transverse bore and a valve full-open position when the resilient sleeve is depressed its maximum distance away from the transverse bore to permit rapid relief of pressurized air.

6. The assembly of claim 5, including means for locking the lever in full-open position.

7. The assembly of claim 6, in which the cooperating cam surfaces lock the lever in full-open position.

8. The assembly of claim 1, including spring means biasing the valve plunger away from the resilient sleeve.

9. The assembly of claim 8, wherein the valve plunger includes a stem portion located in the transverse bore and an upper head portion of greater diameter than the stem an wherein said spring means acts against the underside of the valve plunger head to bias the plunger away from the resilient sleeve.

* * * * *